United States Patent Office 3,357,882
Patented Dec. 12, 1967

3,357,882
THIOL-PHOSPHORIC ACID ESTERS
FUNGITOXIC AGENTS
Hans Scheinpflug, Leverkusen, Germany, Herbert Ferdinand Jung, Tokyo, Japan, and Gerhard Schrader, Wuppertal- Cronenberg, Germany, assignors to Farbenfabriken Bayer Aktiengesellschaft, Leverkusen, Germany, a German corporation
No Drawing. Filed Oct. 21, 1964, Ser. No. 405,889
Claims priority, application Germany, Nov. 7, 1963, F 41,215
15 Claims. (Cl. 167—30)

The present invention relates to fungitoxic agents, and more especially to thiol-phosphoric acid esters used in compositions and preparations for applying to fungi and their habitat for protective and curative action against such fungi, and to methods of using certain known compounds in a new way for crop control purposes.

It is already generally known that undesired fungus growth can be combated by the use of certain fungitoxic substances, which are applicable in or on live or dead matter.

For combating fungus rice diseases, especially that caused by the fungus *Piricularia oryzae*, there have hitherto been used either organic mercury compounds, e.g. phenyl mercury acetate or the antibiotic Blasticidin S, or a mixture of both preparations. The first mentioned active substances possess, however, the known great disadvantage of a high toxicity to warm-blooded creatures. Furthermore, certain organic merucry compounds, for example, phenyl mercury acetate, have a phytotoxic action on some varieties of rice. Finally, although the aryl mercury salts and also the aforementioned antibiotic, Blasticidin S, are indeed distinguished by a good curative action, they possess only a weak protective effect.

From the series of the main fungicidal preparations which are commercially available, such as N-trichloro-methylthio-tetrahydrophthalimide, the metal salts of ethylene-bisdithio-carbamic acid or tetramethyl thiuram disulphide, hitherto no active agent or compound has become known which shows in practice a sufficient activity against fungi causing diseases on rice plants. For this reason, the hitherto known organic fungicides have hardly at all been used in practice for combating rice diseases caused by phytopathogenic fungi.

It is an object of the present invention to overcome the foregoing drawbacks and to provide fungitoxic agents, and more especially thiol-phosphoric acid esters used in compositions and preparations for applying to fungi and their habitat for protective and curative action against such fungi.

It is a further object of the present invention to provide the methods of using certain known compounds in a new way for crop control purposes.

It is a further object of the present invention to provide new fungitoxic preparations, including a thiol-phosphoric acid ester of a particular type as noted more fully hereinbelow in admixture with a carrier vehicle.

It is a still further object of the present invention to provide a fungitoxic preparation in which the active ingredient or compound is used with a dispersible carrier vehicle, such as a finely divided solid or a liquid, preferably with the carrier vehicle being present in a major amount in the mixture with the fungitoxic agent or compound.

Other and further objects of the present invention will become apparent from a study of the within specification and accompanying examples.

It has been found in accordance with the present invention that compounds of the general formula

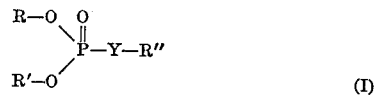

in which R is selected from the group consisting of alkyl and cycloalkyl, radicals, R' is an alkyl radical, Y is a linking radical selected from the group consisting of —S—, —S—CH$_2$—S—, and —S—CH$_2$—, and R" is an aryl radical, are distinguished by a strong fungitoxic effect. In this regard, fungitoxic preparations comprising a carrier vehicle in admixture with an amount sufficient to combat fungi of a thiol-phosphoric acid ester of the general formula

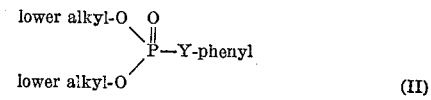

in which Y is defined as above, have been found particularly effective as well as fungitoxic preparations comprising a carrier vehicle in admixture with an amount sufficient to combat fungi of a thiol-phosphoric acid ester of the general formula

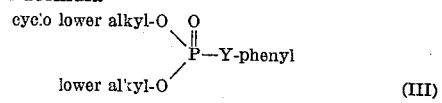

wherein Y is defined as above. Such acid ester may be present in admixture with a major amount of a finely divided dispersible solid or a dispersible liquid as carrier vehicle, such solid or liquid being preferably inert.

In particular, in accordance with one embodiment of the present invention, thiol-phosphoric acid esters are contemplated which have the general formula

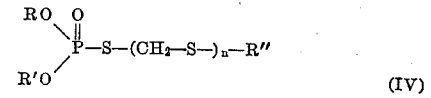

In the aforementioned formula, R stands for a linear or branched, optionally halogen-substituted, preferably lower, alkyl radical or an optionally alkyl-substituted, cycloalkyl radical, while R' is a linear or branched, optionally halogen-substituted, preferably lower, alkyl radical, R" stands for an aryl, preferably phenyl, radical which may be substituted by halogen atoms, lower alkyl, alkoxy or nitro groups and the index $n$ has the value 0 or 1.

Thus, in accordance with this first embodiment, a fungitoxic preparation may be provided for effectively combating fungi, including a carrier vehicle in admixture with the noted thiol-phosphoric acid ester, and preferably in Formula IV R is defined as a member selected from the group consisting of alkyl and cyclo alkyl radicals, R' is defined as alkyl radical, R" is defined as an aryl radical, and $n$ is a whole number having a value of from 0 to 1 as indicated. Suitably, the fungitoxic preparation may comprise an inert dispersible carrier vehicle in admixture with between about 0.1–95% by weight of the mixture and sufficient to combat the fungi of a thiol-phosphoric acid ester of the general formula

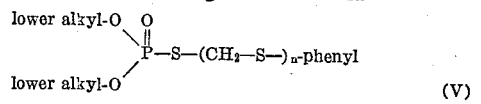

in which $n$ has the aforementioned definition, or of a thiol-phosphoric acid ester of the general formula

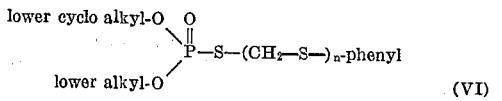

wherein n has the aforementioned definition.

In accordance with a second embodiment of the present invention, thiol-phosphoric acid esters are contemplated which have the general formula

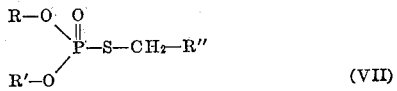
(VII)

In the last mentioned formula, R and R' stand for equal or different straight-chain or branched, preferably lower, alkyl radicals, while R can also represent a cycloalkyl radical, whereas R'' represents an, optionally halogen-substituted, aryl, preferably phenyl, radical.

Thus, in accordance with this second embodiment, a fungitoxic preparation may be provided for effectively combating fungi, including a carrier vehicle in admixture with the noted thiol-phosphoric acid ester, and preferably in formula VII R is defined as a member selected from the group consisting of alkyl and cyclo alkyl radicals, R' is defined as alkyl radical, and R'' is defined as an aryl radical. Suitably, the fungitoxic preparation may comprise an inert dispersible carrier vehicle in admixture with between about 0.1–95% by weight of the mixture and sufficient to combat the fungi of a thiol-phosphoric acid ester of the general formula

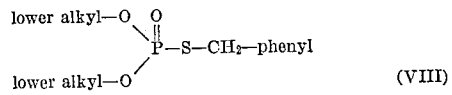
(VIII)

or of a thiol-phosphoric acid ester of the general formula

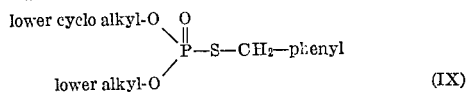
(IX)

The compounds of the aforesaid constitution in accordance with the present invention surprisingly possess, in spite of their strong fungitoxic action, only a slight toxicity to warm-blooded animals or creatures and are therefore outstandingly suited for the combating of undesired fungus growth. To this must be added the outstanding compatibility of such substances to be employed according to the present invention, with higher plants, which enables such substances to be used without difficulty as plant protection agents against fungus diseases. Fungitoxic agents based on the above mentioned thiol-phosphoric acid esters can be applied for combating fungi of the most varied classes, e.g. Archimycetes, Phycomycetes, Ascomycetes, Basidiomycetes, and Fungi Imperfecti.

The compounds or substances to be used according to the present invention have, however, proved especially valuable in combating rice diseases. These products show an excellent protective action; moreover, they possess in part also an outstanding curative action.

Apart from their application against the fungus *Piricularia oryzae,* these active compounds of the present invention can also be used for combating other organisms causing rice diseases, such as *Cochliobolus miyabeanus* and *Corticium sasakii.*

Furthermore, they are very effective against parasitic fungi on parts of plants above ground, such as Mycosphaerella, Cercospora, and Colletotrichum species.

Finally, they also possess activity against fungi causing tracheomycosis, such as Verticillium and Fusarium species.

The thio-phosphoric acid esters to be employed according to the present invention are already known as such from the literature and can readily be produced, also on a technical scale, for example, with respect to the compounds of the first mentioned embodiment, according to the details given in French patent specification No. 1,336,360 and in German patent specification Nos. 839,509 and 1,016,260, and, with respect to the compounds of the second mentioned embodiment, according to the instructions of German patent specification Nos. 1,083,809, 1,018,053 and 949,231, and of Belgian patent specification No. 627,458.

For application as fungitoxic agents, the substances in question can be used alone or in combination with each other. A mixture with other plant protection agents, such as fungicides, herbicides, insecticides and/or bactericides, is also possible.

The substances to be employed according to the present invention can be used as such or in the form of the usual formulations with carrier vehicles. Examples are emulsifiable concentrates, spray powders, pastes, soluble powders, dusting agents and granulates. The individual formulations are produced in known manner (cf. e.g. Agricultural Chemicals, March 1960, pages 35–38). Suitable carrier vehicles or assistants are mainly: solvents, such as, optionally chlorinated, aromatic hydrocarbons (e.g. xylene, benzene, chlorobenzenes), paraffins (e.g. petroleum fractions), alcohols (e.g. methanol, ethanol, butanol), amines (e.g. ethanolamine, dimethyl formamide), as well as water; finely divided solid carriers, for example, natural and synthetic stone meals or powders (kaolin, alumina, chalk, i.e., calcium carbonate, talc, highly disperse silicic acid, silicates, e.g. alkali silicates); emulsifiers, such as non-ionic and anionic emulsifiers (e.g. polyoxyethylene fatty acid esters and polyoxyethylene fatty alcohol ethers, alkyl sulfonates and aryl sulfonates) especially magnesium stearate, sodium oleate, etc., and dispersing agents such as lignin, sulfite waste liquors and methyl cellulose.

As already mentioned above, the active compounds or agents to be employed according to the instant invention can be present in the aforesaid formulations in mixture with one another and with other known active substances.

Formulations contain, in accordance with the present invention, in general from 0.1 to 95, preferably 0.5 to 90, percent by weight of active compound or agent.

The agents according to the present invention or their preparations are applied in the usual way, e.g. by spraying, dusting, sprinkling or atomizing. The active substances can be applied, according to the purpose in view, in a concentration of 5 to 0.0005%. In special cases it is, however, possible or even necessary to go below or above these concentrations.

In accordance with the foregoing, it will be realized that in addition to providing fungitoxic preparations or compositions, the present invention provides a method of combating fungi which comprises applying to the fungi and their habitat a fungitoxic amount of a thiol-phosphoric acid ester of the foregoing kinds. The particular thiol-phosphoric acid ester in question may be applied advantageously in the form of a mixture with a dispersible carrier vehicle, and, for example, such acid ester may be present in the mixture with a major amount of an inert finely divided dispersible solid or inert dispersible liquid as the carrier vehicle. Such acid ester, nevertheless, may be present in the mixture in an over-all amount of from about 0.1 to 95% by weight of the total mixture, as aforesaid, or, if desired, such acid ester may be present in the mixture in a concentration of from about 5 to 0.0005%. In this connection, the present invention contemplates methods of preventing fungus growth on plant crops generalll by applying to such plant crops a fungitoxic amount, sufficient to prevent fungus growth, of a thiol-phosphoric acid ester of the type defined hereinabove.

The term alkyl or alkyl radical as used herein, i.e. both in the specification and claims, contemplates substituted and unsubstituted normal and branched as well as saturated and unsaturated carbon chains, such as $C_1$–$C_{12}$ (methyl to dodecyl) alkyl chains, including especially $C_1$–$C_6$ (methyl to hexyl) lower alkyl chains, as well as halogen-substituted chains. Among the substituents which may be included thereon are $C_1$–$C_6$ (methyl to hexyl) lower alkyl chains which may be normal or branched, i.e. substituted with further lower alkyl groups ($C_1$–$C_4$), as well as saturated or unsaturated carbon chains. Representative of the alkyl groups contemplated herein are, for example, methyl, ethyl, propyl, isopropyl, n-butyl, isobutyl, sec.-butyl, tert.-butyl, n-amyl, isoamyl, tert.-amyl, the hexyls, heptyls, octyls, nonyls, decyls, undecyls, dodecyls, etc., i.e. those radicals derived from the paraffin series, including methane, ethane, propane, n-butane, isobutane (2-methyl propane), n-pentane, isopentane (2-methyl butane), tert.-pentane (2,2-dimethyl propane), n-hexane, 2-methyl pentane, 3-methyl pentane, 2,2-dimethyl butane, 2,3-dimethyl butane, etc., n-heptane, 2-methyl hexane, 3-methyl hexane, 2,2-dimethyl pentane, 2,3-dimethyl pentane, 2,4-dimethyl pentane, 3,3-dimethyl pentane, 3-ethyl pentane, 2,2,3-trimethyl butane, etc., octanes, nonanes, decanes, undecanes, dodecanes, etc.; vinyl, α-allyl, β-allyl, γ-allyl, $\Delta'$-butenyl, $\Delta^2$-butenyl, $\Delta^3$-butenyl, isobutenyl, $\Delta^1$-pentenyl, $\Delta^2$-pentenyl, $\Delta^1$-hexenyl, $\Delta^2$-hexenyl, $\Delta^3$-hexenyl, etc., the heptenyls, octenyls, nonenyls, decenyls, undecenyls, dodecenyls, etc., i.e., those radicals derived from the ethylene series, including ethylene, propylene, butene-1, butene-2, isobutylene (2-methyl propene), pentene-1 (n-amylene), pentene-2 (isoamylene), $\Delta^1$-hexylene (n-hexylene), $\Delta^2$-hexylene, $\Delta^3$-hexylene, etc., heptenes, octenes, nonenes, decenes, undecenes, dodecenes, etc., and the like; as well as corresponding halogen-substituted radicals of the foregoing, such as chloroethyl, etc.

The term cycloalkyl or cycloalkyl radical as used herein, i.e. both in the specification and claims, contemplates substituted and unsubstituted as well as saturated and partially unsaturated aliphatic cyclic carbon chains, such as $C_3$–$C_8$ (cyclopentyl to cyclooctyl) cycloalkyl chains, especially cyclo lower alkyl radicals ($C_3$–$C_6$), and including those radicals in which the replaceable hydrogen atom is located on an open alkyl chain substituent attached to a ring carbon atom of the cyclic moiety. Among the substituents which may be included on the ring are $C_1$–$C_6$ (methyl to hexyl) lower alkyl chains which may be normal or branched, i.e. substituted with further lower alkyl groups ($C_1$–$C_4$), as well as saturated or unsaturated carbon chains. Representative of the cycloalkyl groups contemplated herein are, for example, cyclopropyl, cyclobutyl, cyclopentyl, cyclohexyl, cycloheptyl, cyclooctyl, cyclopropenyl, cyclobutenyl ($\Delta^1$-tetramethlenyl), cyclopentyl, cyclohexenyl, cycloheptenyl, cyclooctenyl, cyclobutylenyl ($\Delta^{1,3}$-tetramethylenyl), cyclopentadienyl ($\Delta^{1,3}$-pentamethylenyl), cyclohexadienyl (including $\Delta^{3,5}$-cyclohexadienyl, $\Delta^{2(4),5}$-cyclohexadienyl, $\Delta^{2,5}$-cyclohexadienyl), cycloheptadienyl, cyclooctadienyl, the corresponding methyl, ethyl, propyl, butyl, etc., vinyl, allyl, butenyl substituted cycloalkyl radicals, such as methyl cyclopentyl, 1,2-dimethyl cyclopentyl, 1,3-dimethyl cyclopentyl, propyl cyclopentyl, ethyl cyclohexyl, butyl cyclohexyl, 1,2,4-trimethyl cyclohexyl, etc., vinyl cyclohexyl, allyl cyclohexyl, butenyl cyclohexyl, cyclohexylmethyl, β-cyclohexylethyl, etc.

The term aryl or aryl radical as used herein, i.e., both in the specification and claims, contemplates substituted as well as unsubstituted aromatic radicals, especially mononuclear and dinuclear aryl radicals, such as phenyl and naphthyl radicals including lower alkyl ($C_1$–$C_6$) substituted aryl, i.e. those radicals in which the replaceable hydrogen atom is located on a carbon atom of the aryl ring nucleus. Among the substituents which may be included on the ring nucleus are $C_1$–$C_6$ (methyl to hexyl) lower alkyl chains which may be normal or branched, i.e., substituted with further lower alkyl groups ($C_1$–$C_4$), as well as saturated or unsaturated carbon chains, and halo-, i.e. chloro-, bromo-, iodo-, and fluoro-, alkoxy, especially $C_1$–$C_6$ lower alkoxy, and nitro groups. Representative of the aryl groups contemplated herein are, for example, phenyl, methylphenyl (tolyl), ethylphenyl, n-propylphenyl, isopropylphenyl (cumenyl), n-butylphenyl, isobutylphenyl, sec. butylphenyl, tert. butylphenyl, etc., and the corresponding methyl-, ethyl-, propyl-, butyl-, etc. naphthyl radicals, vinyl phenyl, vinyl naphthyl, allylphenyl, etc., and the di- and tri- lower alkyl substituted aryl radicals, etc., as well as the corresponding halo-, alkoxy, and nitro-substituted radicals of the foregoing, such as chloro-, bromo-, iodo- and fluoro-phenyl and/or naphthyl radicals, methoxy-, ethoxy-, propoxy-phenyl and/or naphthyl radicals, and nitro-phenyl and/or nitronaphthyl radicals; etc.

In particular, in the foregoing formulae R may be selected from the group consisting of methyl, ethyl, n-propyl, isopropyl, n-butyl, sec.-butyl, 1,2,2-trimethylpropyl, cyclohexyl, 3,3,5-trimethyl-cyclohexyl, and chloroethyl, R' may be selected from the group consisting of methyl, ethyl, n-propyl, isopropyl, n-butyl, sec.-butyl, 1,2,2-trimethylpropyl, and chloroethyl, and R" may be selected from the group consisting of phenyl, 2-chlorophenyl, 3-chlorophenyl, 4-chlorophenyl, 3,4-dichlorophenyl, 2-methylphenyl, and 4-methylphenyl. Compounds having such substituents have been found to be favorably effective as fungitoxic agents, especially when applied in admixture with a carrier vehicle, even in slight concentrations of from 5 to 0.0005%, such as applying the same by spraying techniques onto plant crops infested with fungi, whereby a curative effect is obtained, or onto plant crops not yet infested, whereby a protective effect will be markedly observed.

The following examples are given for the purpose of illustrating the effects according to the invention.

EXAMPLE 1

*Piricularia test: Liquid preparation of active substance*

A liquid preparation of the active compound with the following composition:

Solvent: 1 part by weight acetone
Dispersing agent: 0.05 part by weight sodium oleate
Other additive: 0.2 part by weight gelatin
Water: 98.75 parts by weight is produced as follows:

The amount of active compound required for the desired concentration in the spray liquor preparation or composition is mixed with the stated amount of solvent and the concentrate obtained is diluted with the stated amount of water containing the other additive and the dispersing agent.

Thirty rice plants, which are about 14 days old, are sprayed with the spray liquor until dripping wet. The plants remain in a greenhouse at a temperature of 22–24° C. and at a relative atmospheric humidity of about 70%, until dry. They are then inoculated with an aqueous suspension of 100,000 to 200,000 spores/ml. of *Piricularia oryzae* and placed in a chamber at a temperature of 24–26° C. and at a relative atmospheric humidity of 100%.

Five days after inoculation, the degree of infestation of all the leaves of the treated plants which were present at the time of inoculation is determined as a percentage of the untreated but also inoculated control plants. 0% means that no infestation occurred and 100% that the infestation is exactly the same as that of the control plants.

The active compounds, their concentrations and the results obtained can be seen from Table 1.

EXAMPLE 2

*Piricularia test: Solid preparation of active substance*

A solid preparation of the active compound with the following composition:

Solvent: 10 parts by weight acetone
Dust base: 100 parts by weight, consisting of

| | Percent |
|---|---|
| Calcium carbonate | 95.5 |
| Silicic acid | 4.0 |
| Magnesium stearate | 0.5 | is prepared as follows:

The amount of active compound required for the desired concentration of the active compound in the dusting agent is mixed with the stated amount of solvent and the concentrate obtained triturated in a mortar with the stated amount of dust base until the solvent has evaporated.

Thirty rice plants, which are about 14 days old, are dusted with this agent. They are then inoculated with an aqueous suspension of 100,000 to 200,000 spores/ml. of *Piricularia oryzae* and placed in a chamber at a temperature of 24° C.–26° C. and at a relative atmospheric humidity of 100%.

Five days after inoculation, the degree of infestation of all the leaves of the treated plants which were present at the time of inoculation is determined as a percentage of the untreated but also inoculated control plants. 0% means that no infestation occurred and 100% means that the infestation is exactly the same as that of the control plants.

The active compounds, their concentrations and the results obtained can be seen from Table 1.

EXAMPLE 3

*Piricularia test: Test of the curative effect*

In the test, with liquid as well as with solid preparations of the active compound, the curative as well as the protective effect of the substances to be used according to the present invention are established. For testing the protective effect, the procedure given in the description of the test is followed exactly. For determining the curative action, the test is modified to the extent that the active agents are applied not before but 24 hours after inoculation. Substances which show an effect when this method of carrying out the experiment is followed, are capable of destroying the fungus after infection and, therefore, have a curative effect.

TABLE 1.—PIRICULARIA TEST

| No. | Active Agent (constitution) | (*) | Percent infestation rate based on untreated control at a concentration of agent of— | | | | | |
|---|---|---|---|---|---|---|---|---|
| | | | 0.1 | 0.05 | 0.01 | 0.005 | 0.001 | 0.0005 |
| 1 | $\langle H \rangle$—O—P(=O)(OCH$_3$)—S—$\langle$—Cl$\rangle$ | l/pr<br>l/cur<br>s/pr<br>s/cur | <br><br>0<br>25 | 0<br>0<br>2 | 0 | | | |
| 2 | $\langle H \rangle$—O—P(=O)(OCH$_3$)—S—$\langle \rangle$ | l/pr<br>l/cur<br>s/pr | <br><br>0 | 0<br>0<br>0 | 0<br><br>1 | 1 | 13 | 75 |
| 3 | $\langle H \rangle$—O—P(=O)(OCH$_3$)—S—$\langle$—Cl$\rangle$ | l/pr<br>l/cur<br>s/pr | <br><br>0 | 0<br>0<br>0 | 0<br><br>0 | | | |
| 4 | $\langle H \rangle$—O—P(=O)(OCH$_3$)—S—$\langle$—Cl$\rangle$ | l/pr<br>l/cur<br>s/pr | <br><br>0 | 0<br>11<br>0 | 1<br><br>0 | 1<br><br>0 | 1<br><br>7 | 37 |
| 5 | (CH$_3$)$_2$ $\langle H \rangle$—O—P(=O)(OCH$_3$)—S—$\langle$—Cl$\rangle$ | l/pr<br>s/pr | <br>1 | 0<br>3 | 3 | | | |
| 6 | $\langle H \rangle$—O—P(=O)(OCH$_3$)—S—$\langle$—CH$_3\rangle$ | l/pr<br>s/pr | <br>1 | 0<br>14 | 3<br>6 | 27 | | |
| 7 | $\langle H \rangle$—O—P(=O)(OCH$_3$)—S—$\langle$—CH$_3\rangle$ | l/pr<br>l/cur<br>s/pr | <br><br>2 | 0<br>17<br>4 | 13 | | | |
| 8 | $\langle H \rangle$—O—P(=O)(OC$_2$H$_5$)—S—$\langle$—Cl$\rangle$ | l/pr<br>l/cur<br>s/pr | <br><br>0 | 0<br>6 | 0 | | | |
| 9 | $\langle H \rangle$—O, n-C$_3$H$_7$—O, P(=S)—S—$\langle$—Cl$\rangle$ | l/pr<br>l/cur<br>s/pr | <br><br>3 | 13<br>25<br>29 | 17 | | | |
| 10 | $\langle H \rangle$—O, iso-C$_3$H$_7$—O, P(=O)—S—$\langle$—Cl$\rangle$ | l/pr<br>l/cur<br>s/pr | <br><br>1 | 2<br>25<br>17 | 9 | | | |
| 11 | n-OC$_3$H$_7$O, CH$_3$O, P(=O)—S—$\langle$—Cl$\rangle$ | l/pr<br>s/pr | <br>0 | 0<br>0 | 0 | | | |

See footnote at end of table.

TABLE 1—Continued

| No. | Active Agent (constitution) | (*) | Percent infestation rate based on untreated control at a concentration of agent of— | | | | | |
|---|---|---|---|---|---|---|---|---|
| | | | 0.1 | 0.05 | 0.01 | 0.005 | 0.001 | 0.0005 |
| 12 | sec.-$C_4H_9O$, $CH_3O$, P(=O)–S–C6H4–Cl | l/pr s/pr | 41 | 0 | | | | |
| 13 | n-$C_3H_7O$, $C_2H_5O$, P(=O)–S–C6H4–Cl | l/pr l/cur s/pr | 0 | 0 0 0 | 0 | | | |
| 14 | iso-$C_3H_7O$, $C_2H_5O$, P(=O)–S–C6H4–Cl | l/pr l/cur s/pr | 11 | 0 8 | 3 | | | |
| 15 | iso-$C_3H_7O$, sec.-$C_4H_9O$, P(=O)–S–C6H4–Cl | l/pr l/cur s/pr | 4 | 0 8 25 | 15 | | | |
| 16 | n-$C_4H_9O$, $C_2H_5O$, P(=O)–S–C6H4–Cl | l/pr l/cur s/pr | 0 | 1 0 2 | 2 | | | |
| 17 | sec.-$C_4H_9O$, $C_2H_5O$, P(=O)–S–C6H4–Cl | l/pr l/cur s/pr | | 0 9 0 | 2 0 | 0 | | |
| 18 | $(CH_2Cl–CH_2–O)_2$–P(=O)–S–C6H4–Cl | l/pr s/pr | 18 | 3 | | | | |
| 19 | $(CH_2Cl–CH_2–O)_2$–P(=S)–S–C6H4–Cl | l/pr s/pr | 42 | 1 | 25 | | | |
| 20 | $(CH_3)_2C(CH_3)$CH–O–P(=O)(OCH_3)–S–C6H4–Cl | l/pr s/pr | 24 | 4 | | | | |
| 21 | $(CH_3)_2C(CH_3)$CH–O–P(=O)(OC_2H_5)–S–C6H4–Cl | l/pr l/cur s/pr | 0 | 1 15 | 3 | | | |
| 22 | sec.-$C_4H_9O$, $C_2H_5O$, P(=O)–S–CH_2–S–C6H4–Cl | l/pr s/pr | 3 | 0 28 | 9 | | | |
| 23 | $C_2H_5O$, $CH_3O$, P(=O)–S–CH_2–S–C6H4–Cl | l/pr s/pr | 7 | 0 | 0 | | | |
| 24 | C6H5–O–P(=O)(OCH_3)–S–CH_2–C6H4–Cl | l/pr l/cur s/pr s/cur | 9 | 0 | 25 | ¹ 0 0.025 | | |
| 25 | $(C_2H_5O)_2$P(=O)–S–CH_2–C6H4–Cl | l/pr l/cur s/pr s/cur | 46 | 0 0 54 | 1 25 | | | |
| 26 | $(C_2H_5O)_2$P(=O)–S–CH_2–C6H3–Cl_2 | l/pr l/cur s/pr s/cur | 0 | 0 30 25 | 20 13 | | | |
| 27 | $(iso-C_3H_7O)_2$P(=O)–S–CH_2–C6H4–Cl | l/pr l/cur s/pr s/cur | 0 75 | 0 50 29 | | | | |
| 28 | iso-$C_3H_7O$, $C_2H_5O$, P(=O)–S–CH_2–C6H4–Cl | l/pr l/cur s/pr | 0 | 0 11 67 | 3 | | | |
| 29 | sec.-$C_4H_9O$, $CH_3O$, P(=O)–S–CH_2–C6H4–Cl | l/pr l/cur s/pr | 13 | 0 50 | | | | |

See footnote at end of table.

TABLE 1—Continued

| No. | Active Agent (constitution) | (*) | Percent infestation rate based on untreated control at a concentration of agent of— | | | | | |
|---|---|---|---|---|---|---|---|---|
| | | | 0.1 | 0.05 | 0.01 | 0.005 | 0.001 | 0.0005 |
| 30 | (CH₃)₃C\CH—O—P(=O)(OCH₃)—S—CH₂—C₆H₄—Cl / CH₃ | l/pr l/cur s/pr | ---------- ---------- 50 | 0 42 ---------- | 0 ---------- ---------- | ---------- ---------- ---------- | 0 ¹0.025 ---------- | ---------- ---------- ---------- |
| 31 | (CH₃)₃C\CH—O—P(=O)(OC₂H₅)—S—CH₂—C₆H₄—Cl / CH₃ | l/pr l/cur s/pr | ---------- ---------- 1 | 2 17 38 | ---------- ---------- ---------- | ---------- ---------- ---------- | 46 ¹0.025 ---------- | ---------- ---------- ---------- |

| No. | Active Agent (constitution) | (*) | Percent infestation rate based on untreated control at a concentration of agent of— | | | |
|---|---|---|---|---|---|---|
| | | | 0.05 | 0.025 | 0.01 | 0.005 |
| 32 | C₂H₅O\P(=O)(OC₂H₅)—S—C₆H₄—F | l/pr cur | 1 1 | 25 ---------- | ---------- ---------- | ---------- ---------- |
| 33 | C₂H₅O\P(=O)(OC₂H₅)—S—C₆H₄—Cl | l/pr cur | 0 0 | 0 ---------- | ---------- ---------- | ---------- ---------- |
| 34 | C₂H₅O\P(=O)(OC₂H₅)—S—C₆H₄—C(CH₃)₃ | l/pr cur | 0 0 | 0 ---------- | 50 17 | ---------- ---------- |
| 35 | C₂H₅O\P(=O)(OC₂H₅)—S—C₆H₃(CH₃)—CH₃ | l/pr cur | 0 25 | 0 ---------- | 75 ---------- | ---------- ---------- |
| 36 | C₂H₅O\P(=O)(OC₂H₅)—S—C₆H₃(Cl)—CH₃ | l/pr cur | 0 0 | 0 40 | 3 ---------- | 45 ---------- |
| 37 | C₂H₅O\P(=O)(OC₂H₅)—S—C₆H₃(Cl)(Cl) | l/pr cur | 0 25 | 0 ---------- | 50 ---------- | ---------- ---------- |
| 38 | C₆H₅—O—P(=O)(OCH₃)—S—CH₂—S—C₆H₄—Cl | l/pr cur | 6 16 | 0 ---------- | 19 ---------- | ---------- ---------- |
| 39 | (CH₃)₂CH—CH₂—CH(CH₃)—O—P(=O)(OCH₃)—S—C₆H₄—Cl | l/pr cur | 0 4 | 0 ---------- | 1 ---------- | ---------- ---------- |

¹ Conc.
(*) Means: l=liquid preparation, s=solid preparation, pr=protective action, cur=curative action.

EXAMPLE 4

*Mycelium growth test*

Nutrient medium: Parts by weight
- Agar-agar powder _____ 20
- Extract of malt _____ 30
- Distilled water _____ 950

Ratio of solvent to nutrient medium:
- Acetone _____ 2
- Agar nutrient medium _____ 100

The amount of active compound required for the desired concentration in the nutrient medium, is mixed with the stated amount of solvent. The concentrate obtained is thoroughly mixed, in the stated ratio, with the liquid nutrient medium, the temperature of which is about 42° C., and then poured into petri dishes of 9 cm. diameter. Control dishes without the active compound are also provided.

When the nutrient medium has cooled and solidified, the dishes are inoculated with the fungi specified in the table and incubated at about 21° C.

Evaluation is carried out after 4 to 10 days, dependent upon the rate of growth of the fungi. For evaluation, the radial growth of the mycelium on the treated nutrient media is compared with the growth on the control media. The evaluation of the mycelium growth is made as follows:

0—no mycelium growth
1—very strong inhibition of growth
2—medium inhibition of growth
3—slight inhibition of growth
4—growth equal to that of untreated control The active compounds, their concentrations and results obtained can be seen from the following table:

TABLE 2.—MYCELIUM GROWTH TEST

| Active Agent (concentration) | Concentration of active agent, p.p.m. | Piricularia oryzae | Cortidum sasakii | Cochliobolus miyabeanus | Mycosphaerella musicola | Cercospora personata | Cercospora coffeicola | Botrytis cinerea | Alternaria tenuis | Septoria azaleae | Phialophora cinerescens | Verticillium albo-atrum | Fusarium oxysp. f. cubense | Fusarium oxysp. f. dianthi |
|---|---|---|---|---|---|---|---|---|---|---|---|---|---|---|
| C6H5-O-P(=O)(OCH3)-S-C6H4-Cl | 500 / 100 / 50 | 0 / 1 / — | 1 / 2 / — | 1 / 2 / 3 | 0 / 2 / 3 | 0 / 0 / 3 | 1 / 2 / 4 | 0 / 0 / 2 | 1 / 3 / — | 0 / 2 / — | 0 / 3 / — | 2 / 3 / — | 2 / 3 / — | 1 / 3 / — |
| C6H5-O-P(=O)(OCH3)-S-C6H5 | 500 / 100 / 50 | 0 / 0 / 0 | 0 / 0 / 2 | 0 / 3 / — | 0 / 0 / 3 | 0 / 0 / 0 | 0 / 1 / 4 | 0 / 3 / — | 1 / 2 / — | 0 / 4 / — | 0 / 2 / 3 | 1 / 4 / — | 1 / 3 / — | 1 / 2 / — |
| C6H5-O-P(=O)(OCH3)-S-C6H4-Cl (meta) | 500 / 100 | 0 / 1 | 0 / 0 | 2 / 4 | 0 / 1 | 2 / 4 | 0 / 3 | 1 / 4 | 2 / 4 | 2 / 3 | 1 / 3 | 1 / 3 | 2 / 4 | 1 / 3 |
| C6H5-O-P(=O)(OCH3)-S-C6H4-Cl (ortho) | 500 / 100 | 0 / 0 | 0 / 0 | 1 / 3 | 0 / 1 | 0 / 0 | 0 / 3 | 1 / 3 | 2 / 4 | — | 1 / 1 | 2 / 4 | 1 / 3 | 1 / 4 |
| 2,6-(CH3)2-C6H3-O-P(=O)(OCH3)-S-C6H4-Cl | 500 / 100 | 0 / 3 | 1 / 2 | — | 2 / 3 | — | — | 2 / 3 | 1 / 4 | — | — | — | — | — |
| C6H5-O-P(=O)(OCH3)-S-C6H4-CH3 | 500 / 100 | 0 / 2 | 1 / 3 | 1 / 3 | 0 / 3 | 0 / 4 | 1 / 4 | 0 / 2 | 1 / 4 | 0 / 1 | 0 / 4 | 1 / 4 | 2 / 4 | 1 / 4 |
| C6H5-O-P(=O)(OCH3)-S-C6H4-CH3 (other isomer) | 500 / 100 / 50 | 0 / 0 / 0 | 0 / 1 / 3 | 1 / 4 | 0 / 3 / 4 | 0 / 0 / 3 | 0 / 1 / 4 | 1 / 3 | 1 / 4 | 0 / 2 | 0 / 2 / 4 | 1 / 3 | 1 / 4 | 2 / 4 |
| n-C3H7O-P(=O)(CH3O)-S-C6H4-Cl | 500 / 100 / 50 | 0 / 0 / 0 | 0 / 0 / 4 | 0 / 2 / 4 | 0 / 1 / 2 | 0 / 0 / 1 | 0 / 2 / 4 | 0 / 2 / — | 0 / 1 / 4 | — | 0 / 2 / 4 | 0 / 1 / 4 | 0 / 2 / 4 | 0 / 1 / 4 |
| (CH2Cl-CH2-O-)2P(=O)-S-C6H4-Cl | 500 / 100 | 0 / 1 | 0 / 2 | 1 / 3 | 0 / 3 | 0 / 3 | 1 / 4 | 1 / 2 | 0 / 3 | 1 / 4 | 1 / 4 | 0 / 4 | 2 / 4 | 2 / 4 |
| (CH3)3C-CH(CH3)-O-P(=O)(OCH3)-S-C6H4-Cl | 500 / 100 | 0 / 2 | 0 / 0 | 1 / 2 | 0 / 3 | — | 2 / 3 | 0 / 1 | 0 / 1 | — | 0 / 4 | 1 / 3 | 0 / 2 | 0 / 2 |
| C2H5O-P(=O)(CH3O)-S-CH2-S-C6H4-Cl | 500 / 100 | 0 / 0 | 0 / 1 | 0 / 3 | 0 / 3 | 0 / 3 | 0 / 4 | 1 / 2 | 1 / 3 | — | 1 / 2 | 1 / 4 | 1 / 3 | 1 / 3 |
| (C2H5O)2P(=O)-S-C6H4-F | 500 / 100 | 0 / 0 | 0 / 2 | 1 / 2 | 0 / 0 | 0 / 1 | 1 / 3 | 0 / 2 | 1 / 4 | — | 0 / 1 | 1 / 2 | 1 / 4 | 1 / 3 |
| (C2H5O)2P(=O)-S-C6H4-Cl | 500 / 100 | 0 / 0 | 0 / 1 | 1 / 2 | 0 / 1 | 0 / 0 | 0 / 4 | 0 / 0 | 0 / 1 | — | 0 / 3 | 0 / 4 | 0 / 2 | 0 / 2 |
| (CH3)3C-C6H4-S-P(=O)(OC2H5)2 | 500 / 100 | 0 / 0 | 0 / 1 | 1 / 2 | 0 / 2 | 0 / 1 | 0 / 4 | 0 / 2 | 0 / 1 | — | 0 / 4 | 1 / 3 | 1 / 2 | 1 / 2 |
| (C2H5O)2P(=O)-S-C6H3(Cl)(CH3) | 500 / 100 | 0 / 0 | 0 / 1 | 1 / 2 | 0 / 1 | 0 / 1 | 0 / 1 | 1 / 4 | 0 / 2 | — | 0 / 1 | 1 / 2 | 1 / 2 | 0 / 2 |

TABLE 2.—MYCELIUM GROWTH TEST—Continued

| Active Agent (concentration) | Concentration of active agent, p.p.m. | Piricularia oryzae | Cortidum sasakii | Cochliobolus miyabeanus | Mycosparella musicola | Cercospora personata | Cercospora coffeicola | Botrytis cinerea | Alternaria tenuis | Septoria azaleae | Phialophora cinerescens | Verticillium albo-atrum | Fusarium oxysp. f. cubense | Fusarium oxysp. f. dianthi |
|---|---|---|---|---|---|---|---|---|---|---|---|---|---|---|
| $(C_2H_5O)_2\overset{O}{\underset{\parallel}{P}}\overset{OCH_3}{\diagdown}$ S—CH$_2$—S—C$_6$H$_4$—Cl | 500 / 100 | 0/0 | 0/1 | 1/2 | 0/0 | 0/0 | 1/4 | 0/1 | 0/1 | —/— | 0/1 | 2/4 | 1/3 | 1/3 |
| C$_6$H$_{11}$—O—P(=O)(OCH$_3$)—S—CH$_2$—S—C$_6$H$_4$—Cl | 500 / 100 | 0/0 | 1/2 | 1/3 | 1/2 | —/— | 2/3 | 2/4 | 0/3 | —/— | 1/4 | 1/3 | 1/3 | 1/3 |
| (CH$_3$)$_2$CH—CH$_2$—CH(CH$_3$)—O—P(=O)(OCH$_3$)—S—C$_6$H$_4$—Cl | 500 / 100 | 0/0 | 1/2 | 1/3 | 1/2 | —/— | 2/3 | 2/4 | 0/3 | —/— | 1/4 | 1/3 | 1/3 | 1/3 |
| (C$_2$H$_5$O)$_2$P(=O)—S—C$_6$H$_3$(CH$_3$)$_2$ | 500 / 100 | 0/0 | 0/1 | 1/2 | 0/2 | —/— | 1/3 | 0/2 | 0/1 | —/— | 0/3 | 1/3 | 1/2 | 1/2 |
| (CH$_2$Cl—CH$_2$—O—)$_2$P(=O)—S—C$_6$H$_5$ | 500 / 100 | 0/0 | 0/2 | 1/4 | 0/0 | —/— | 1/2 | 1/4 | 0/3 | —/— | 0/1 | 0/1 | 1/4 | 1/4 |
| (C$_2$H$_5$O)$_2$P(=O)—S—C$_6$H$_4$—Cl | 500 / 100 | 0/0 | 0/0 | 0/3 | 0/2 | —/— | 1/3 | 0/1 | 0/1 | —/— | 0/4 | 1/3 | 1/2 | 0/1 |
| C$_6$H$_{11}$—O—P(=O)(OCH$_3$)—S—CH$_2$—C$_6$H$_4$—Cl | 500 / 100 | 0/0 | 0/2 | 2/3 | 0/3 | —/— | 2/4 | 0/3 | 0/4 | 1/4 | 0/2 | 0/1 | 2/4 | 2/3 |
| (C$_2$H$_5$O)$_2$P(=O)—S—CH$_2$—C$_6$H$_3$Cl$_2$ | 500 / 100 | 0/0 | 0/1 | 0/3 | 0/2 | 0/1 | 0/4 | 0/0 | 0/0 | 0/4 | 0/1 | 0/2 | 0/1 | 0/1 |
| (C$_2$H$_5$O)$_2$P(=O)—S—CH$_2$—C$_6$H$_4$—Cl | 500 / 100 / 50 | 0/0/0 | 0/0/— | 1/2/— | 0/1/4 | 1/0/2 | 2/2/4 | 0/1/— | 0/2/— | 0/0/— | 0/2/4 | 1/2/— | 1/2/— | 1/2/— |
| i-C$_3$H$_7$O—P(=O)(OC$_2$H$_5$)—S—CH$_2$—C$_6$H$_4$—Cl | 500 / 100 | 0/0 | 0/0 | 1/2 | 0/1 | 0/1 | 1/2 | 0/1 | 1/3 | 0/4 | 0/2 | 1/3 | 0/3 | 0/3 |
| (CH$_3$)$_2$C(CH$_3$)—CH(OC$_2$H$_5$)—O—P(=O)—S—CH$_2$—C$_6$H$_4$—Cl | 500 / 100 | 0/0 | 0/1 | 2/3 | 2/4 | 1/2 | —/— | 1/3 | 0/1 | —/— | —/— | —/— | —/— | —/— |

The term lower alkyl as used herein, i.e., both in the specification and claims, and especially in the structural formulae, contemplates linear and branched $C_1$–$C_6$ alkyl chains, including halo-substituted chains, i.e., especially chloro-substituted $C_1$–$C_6$ alkyl chains but also bromo-, iodo-, and fluoro-substituted $C_1$–$C_6$ alkyl chains, such as methyl, ethyl, n-propyl, isopropyl, n-butyl, isobutyl, sec.-butyl, tert.-butyl, n-amyl, iso-amyl, n-hexyl, etc., chloromethyl, chloroethyl, dichloroethyl, chloropropyl, etc., bromo-methyl, bromo-ethyl, iodo-methyl, iodo-ethyl, fluoro-methyl, fluoro-ethyl, etc.

The term cyclo lower alkyl and/or lower cycloalkyl as used herein, i.e., both in the specification and claims, and especially in the structural formulae, contemplates substituted and unsubstituted alicyclic $C_3$–$C_6$ saturated rings, including lower alkyl ($C_1$–$C_4$) substituted saturated rings, such as cyclopropyl, cyclobutyl, cyclopentyl, cyclohexyl, methyl cyclohexyl, dimethyl cyclohexyl, trimethyl cyclohexyl, ethyl cyclohexyl, diethyl cyclohexyl, n-propyl cyclohexyl, iso-propyl cyclohexyl, n-butyl cyclohexyl, iso-butyl cyclohexyl, sec.-butyl cyclohexyl, tert.-butyl cyclohexyl, etc.

The term phenyl as used herein, i.e., both in the specification and claims, and especially in the structural formulae, contemplates both substituted and unsubstituted phenyl radicals, including halogen-substituted phenyl radicals, i.e., especially chloro-substituted phenyl but also bromo-, iodo-, and fluoro-substituted phenyls, lower alkyl-substituted phenyl, i.e., linear or branched $C_1$–$C_6$ alkyl-substituted phenyls, lower alkoxy-substituted phenyl, i.e., linear or branched $C_1$–$C_6$ alkoxy-substituted phenyls, and nitro-substituted phenyl, such as the phenyl radical ($C_6H_5$—), chlorophenyl, dichlorophenyl, bromophenyl, iodophenyl, fluorophenyl, and the di- and the tri-substituted corresponding halo-phenyls, methyl phenyl, dimethyl phenyl, trimethyl phenyl, ethyl phenyl, n-propyl phenyl, iso-propyl phenyl, n-butyl phenyl, iso-butyl phenyl, sec.-butyl phenyl, tert.-butyl phenyl, n-amyl phenyl, iso-amyl phenyl, n-hexyl phenyl, the corresponding di- and tri-substituted $C_2$–$C_6$ lower alkyl substituted phenyls, etc., methoxy phenyl, dimethoxy phenyl, trimethoxy phenyl, ethoxy phenyl, di-ethoxy phenyl, methoxy-ethoxy phenyl, n-propoxy phenyl, iso-propoxy phenyl, n-butoxy phenyl, iso-butoxy phenyl, sec.-butoxy phenyl, tert.-butoxy phenyl, n-amyloxy phenyl, iso-amyloxy phenyl, n-hexyloxy phenyl, and the corresponding di-lower alkoxy substituted phenyls, etc., nitro phenyl, di-nitro phenyl, etc.

It will be appreciated that the instant specification and examples are set forth by way of illustration and not limitation, and that various modifications and changes may be made without departing from the spirit and scope of the present invention which is to be limited only by the scope of the appended claims.

What is claimed is:

1. Method of combating fungi which comprises applying to such fungi a fungitoxic amount of a thiol-phosphoric acid ester of the formula

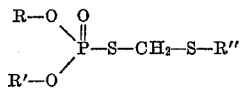

in which R is selected from the group consisting of alkyl having 1–12 carbon atoms, haloalkyl having 1–12 carbon atoms, cycloalkyl having 3–8 ring carbon atoms, and alkyl-substituted cycloalkyl having 3–8 ring carbon atoms and 1–6 alkyl carbon atoms substituted on the ring, R' is selected from the group consisting of alkyl having 1–12 carbon atoms and haloalkyl having 1–12 carbon atoms, R'' is selected from the group consisting of phenyl and substituted phenyl which is substituted with a substituent selected from the group consisting of alkyl having 1–6 carbon atoms, halo, and mixtures thereof.

2. Method according to claim 1 wherein said acid ester is applied in the form of a mixture with an inert dispersible carrier vehicle, said acid ester being present in a concentration of from about 5 to 0.0005%.

3. Method according to claim 1 wherein said acid ester is used in admixture with a major amount of an inert, finely divided dispersible solid as carrier vehicle.

4. Method according to claim 1 wherein said acid ester is used in admixture with a major amount of an inert dispersible liquid as carrier vehicle.

5. Method according to claim 1 wherein said acid ester is used in the form of a mixture with a dispersible carrier vehicle, said ester being present in an amount of between about 0.1 to 95% by weight of the mixture.

6. Method of combating fungi which comprises applying to such fungi a fungitoxic amount of a thiol-phosphoric acid ester of the formula

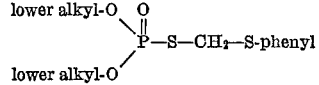

7. Method according to claim 6 wherein said acid ester is used in the form of a mixture with a dispersible carrier vehicle, said ester being present in an amount of between about 0.1 to 95% by weight of the mixture.

8. Method of combating fungi which comprises applying to such fungi a fungitoxic amount of a thiol-phosphoric acid ester of the formula

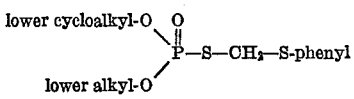

9. Method according to claim 8 wherein said acid ester is used in the form of a mixture with a dispersible carrier vehicle, said ester being present in an amount of between about 0.1 to 95% by weight of the mixture.

10. Method of combating fungi which comprises applying to such fungi a mixture of a dispersible carrier vehicle and a fungitoxic amount of between about 0.1 to 95% by weight of the mixture of a thiol-phosphoric acid ester of the formula

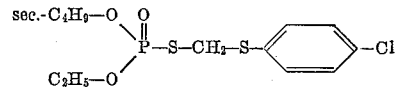

11. Method of combating fungi which comprises applying to such fungi a mixture of a dispersible carrier vehicle and a fungitoxic amount of between about 0.1 to 95% by weight of the mixture of a thiol-phosphoric acid ester of the formula

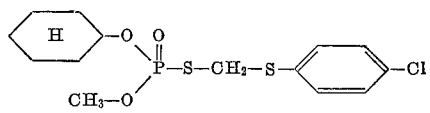

12. Method of combating fungi which comprises applying to such fungi a mixture of a dispersible carrier vehicle and a fungitoxic amount of between about 0.1 to 95% by weight of the mixture of a thiol-phosphoric acid ester of the formula

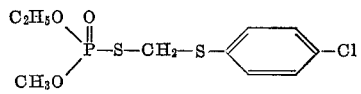

13. Method of combating fungi which comprises applying to such fungi a fungitoxic amount of a compound having the formula

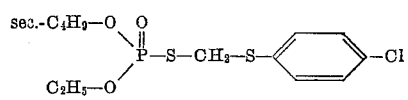

14. Method of combating fungi which comprises applying to such fungi a fungitoxic amount of a compound having the formula

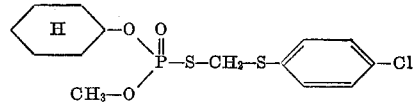

15. Method of combating fungi which comprises applying to such fungi a fungitoxic amount of a compound having the formula

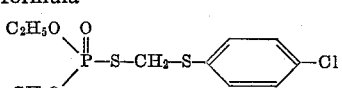

References Cited

UNITED STATES PATENTS

| | | |
|---|---|---|
| 2,690,450 | 9/1954 | Gilbert. |
| 3,089,807 | 5/1963 | Trademan. |
| 3,197,405 | 6/1965 | Le Suer. |
| 3,274,051 | 9/1966 | Kado et al. |

FOREIGN PATENTS

| | | |
|---|---|---|
| 817,057 | 10/1951 | Germany. |
| 817,753 | 10/1951 | Germany. |
| 830,509 | 2/1952 | Germany. |
| 949,231 | 9/1956 | Germany. |
| 1,018,053 | 10/1957 | Germany. |
| 1,070,624 | 12/1959 | Germany. |
| 1,083,809 | 6/1960 | Germany. |

ALBERT T. MEYERS, *Primary Examiner.*

SAM ROSEN, JULIAN S. LEVITT, *Examiners.*

J. GOLDBERG, *Assistant Examiner.*